United States Patent
Wulff et al.

(10) Patent No.: US 8,260,384 B2
(45) Date of Patent: Sep. 4, 2012

(54) WEARABLE MOBILE COMPUTING SYSTEM

(75) Inventors: Thomas Wulff, North Patchogue, NY (US); Mark Duron, East Patchogue, NY (US); Russell Calvarese, Stony Brook, NY (US); Shane MacGregor, Forest Hills, NY (US); David Bellows, Wantagh, NY (US); Robert Sandler, Holtsville, NY (US); Daniella Strat, Sound Beach, NY (US); Rehan Jaffri, Rego Park, NY (US)

(73) Assignee: Symbol Technologies, Inc., Holtsville, NY (US)

(*) Notice: Subject to any disclaimer, the term of this patent is extended or adjusted under 35 U.S.C. 154(b) by 1070 days.

(21) Appl. No.: 11/767,968

(22) Filed: Jun. 25, 2007

(65) Prior Publication Data

US 2008/0054039 A1    Mar. 6, 2008

Related U.S. Application Data (60) Provisional application No. 60/842,626, filed on Sep. 5, 2006.

(51) Int. Cl.
*A45F 5/00* (2006.01)

(52) U.S. Cl. ............ 455/575.6; 224/267; 224/575

(58) Field of Classification Search .......... 455/456.1, 455/550.1, 575.1–2, 575.6, 90.2, 518; 224/575, 224/267, 197, 269, 930, 667
See application file for complete search history.

(56) References Cited

U.S. PATENT DOCUMENTS

| | | | |
|---|---|---|---|
| 4,491,325 A * | 1/1985 | Bersheim | 463/38 |
| 6,098,877 A * | 8/2000 | Barkan et al. | 235/25 |
| 6,443,340 B1 * | 9/2002 | Chung et al. | 224/197 |
| 6,853,293 B2 * | 2/2005 | Swartz et al. | 340/5.92 |
| 6,983,169 B2 * | 1/2006 | Vogel et al. | 455/550.1 |
| 7,019,622 B2 * | 3/2006 | Orr et al. | 340/407.1 |
| 7,110,802 B1 * | 9/2006 | Kim et al. | 455/575.6 |
| 2002/0099895 A1 | 7/2002 | Landron et al. | |
| 2003/0071791 A1 * | 4/2003 | Hanson et al. | 345/169 |
| 2005/0282576 A1 * | 12/2005 | Delker et al. | 455/550.1 |
| 2006/0270361 A1 * | 11/2006 | Szymanski et al. | 455/90.2 |
| 2007/0057069 A1 * | 3/2007 | Terlizzi et al. | 235/472.01 |

FOREIGN PATENT DOCUMENTS

| | | |
|---|---|---|
| EP | 1569315 | 8/2005 |
| JP | 2001267946 A * | 9/2001 |
| WO | 01/95752 | 12/2001 |
| WO | 2004/114401 | 12/2004 |
| WO | 2006/055125 | 5/2006 |
| WO | 2008030773 | 3/2008 |

OTHER PUBLICATIONS

International Preliminary Report on Patentability and Written Opinion dated Mar. 10, 2009 corresponding to PCT/US2007/077375, a foreign counterpart.

International Search Report mailed Apr. 29, 2008, corresponding to PCT/US2007/077375, a foreign counterpart.

* cited by examiner

*Primary Examiner* — Kamran Afshar
*Assistant Examiner* — Kashif Siddiqui (57) ABSTRACT

A system having a mobile device and a wearable mount configured to couple to the mobile device, the coupling making the mobile device wearable at a worn location, wherein a set of functionalities of the mobile device corresponds to the worn location. The wearable mount having a coupler configured to couples to a mount coupling of a mobile device and a fastener that fastens the wearable mount to a location, the location, a set of functionalities of the mobile device being based on the location.

23 Claims, 9 Drawing Sheets

WEARABLE MOBILE COMPUTING SYSTEM

PRIORITY CLAIM

This application claims the priority to the U.S. Provisional Application Ser. No. 60/842,626, entitled "Finger Mounted Mobile Computer," filed Sep. 5, 2006. The specification of the above-identified application is incorporated herewith by reference.

FIELD OF THE INVENTION

The present invention relates generally to a mobile device that is wearable in a plurality of locations.

BACKGROUND

Circuit technology has advanced to allow mobile devices to incorporate small hardware components, thereby also decreasing the size of the mobile device itself. Mobile device technology has also advanced to allow portability. For example, conventional mobile devices may be equipped with wearable mechanisms to increase the flexibility of the user while still utilizing the functions of the mobile device. These wearable mechanisms may be used to hold the conventional mobile device on a variety of locations. However, the mobile device may be limited to a particular location to be worn. Thus, the mobile device may be efficient to perform certain functionalities when worn in a particular location but inefficient to perform other functionalities when worn in that particular location.

Conventional mobile devices may further equip other hardware devices such as scanners, RFID readers, etc. However, these other hardware devices are wired externally into the conventional mobile devices. Thus, the functionality of the mobile device and/or other hardware devices may be interrupted when, for example, the wiring is disconnected. Conventional mobile devices may integrate the other hardware devices. However, these devices must be hand-held in order to use, for example, a scanner.

SUMMARY OF THE INVENTION

A system having a mobile device and a wearable mount configured to couple to the mobile device, the coupling making the mobile device wearable at a worn location, wherein a set of functionalities of the mobile device corresponds to the worn location.

A mobile device having a mount coupler configured to couple to a wearable mount and a processor determining a set of functionalities for the mobile device based on a type of the wearable mount to which the mount coupler is coupled.

A wearable mount having a coupler configured to couples to a mount coupling of a mobile device and a fastener that fastens the wearable mount to a location, the location, a set of functionalities of the mobile device being based on the location.

A mobile device having a means for receiving an indication of a type of a wearable mount to which the mobile device is coupled and a processor determining a set of functionalities for the mobile device based on the type of the wearable mount to which the mount coupler is coupled.

DETAILED DESCRIPTION

The present invention may be further understood with reference to the following description and the appended drawings, wherein like elements are referred to with the same reference numerals. The exemplary embodiments of the present invention describe a mountable mobile computer that may be worn in a variety of locations using a variety of mounts. For example, the mountable mobile computer may be worn on a finger, a wrist, and a waist. The mounts may include a fastening device to securely fasten the mountable mobile computer to the finger, wrist, or waist. Therefore, according to the exemplary embodiments of the present invention, depending on the location in which the mountable mobile computer is worn, various functionalities may take precedence over other functionalities. The mountable mobile computer, various mounts, and respective functionalities will be discussed in detail below.

Figure 1:
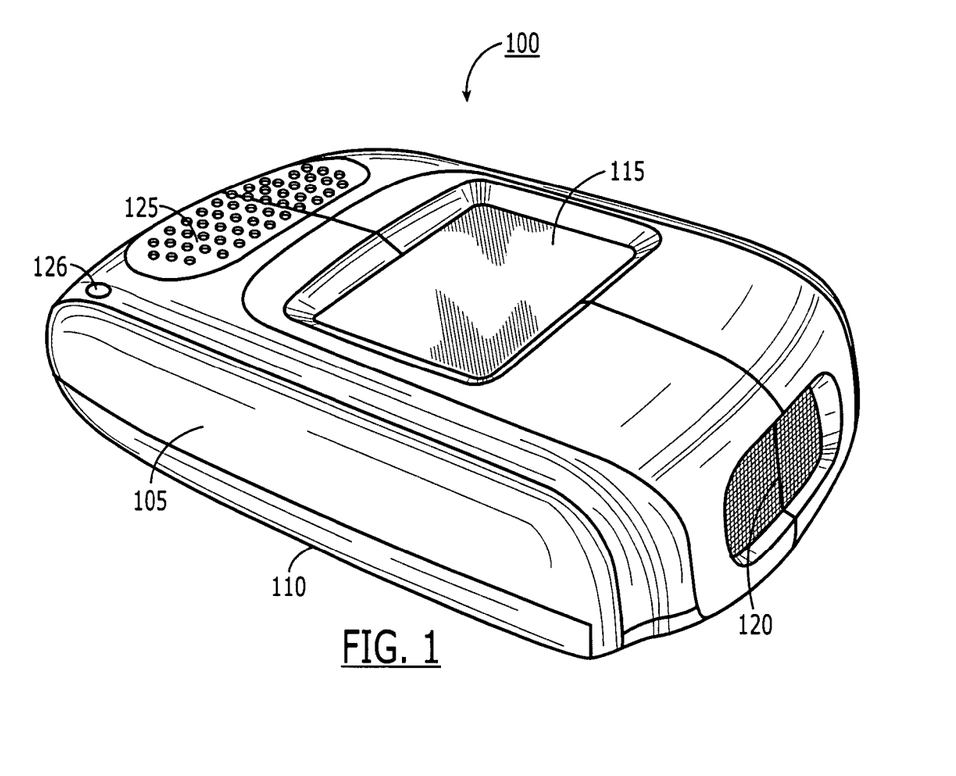
FIG. 1 shows an exemplary embodiment of a mountable mobile computer according to the present invention.

FIG. 1 shows an exemplary embodiment of a mountable mobile computer 100 according to the present invention. The mountable mobile computer 100 may be a mobile terminal that may be worn on various locations of a user's body when combined with a respective mount. The mountable mobile computer 100 may include various components and functions. In FIG. 1, the mountable mobile computer 100 may include a top housing 105, a bottom housing 110, a display 115, a scanner 120, an audio output 125, and a voice input 126. The mountable mobile computer 100 may include further components and functionalities beyond what is illustrated in FIG. 1. These further components and functionalities will be discussed in more detail below with reference to FIG. 2. In addition, the mountable mobile computer 100 may include a keypad (not shown) to enable a user to manually input data, switch between menus or displays on the display 115, activate/deactivate components, etc. The keypad may be several pin buttons found along a side of the housing 105, buttons found on a top side of the housing 105, etc. The key pad may also be embodied as part of the display 115. That is, the key pad may be a touch screen that is part of the display 115. The mountable mobile computer 100 may also include a port (not shown) to enable a user to insert other hardware devices such as a removable memory device (e.g., a secure digital (SD) card).

The top housing 105 and the bottom housing 110 may provide a casing for the components of the mountable mobile computer 100. In the exemplary embodiment, the components may be housed within the top housing 105 and the bottom housing 110 or at least partially on the periphery of the top housing 105. For example, the display 115, the scanner 120, the audio output 125, and the voice input 126 may be housed at least partially on the periphery of the top housing 105. The further components may be housed within the top housing 105 and the bottom housing 110, which will be discussed in more detail below. It should be noted that the display 115, the scanner 120, the audio output 125, and the voice input 126 may be designed using conventional technologies but are sized to fit within/on the top and/or bottom housing 105, 110. Due to the size of the mountable mobile computer 100, the display 115 may be designed to show only relevant information corresponding to the intended uses of the mountable mobile computer 100. The top housing 105 and the bottom housing 110 may be manufactured using a rigid plastic. The bottom housing 105 may exhibit a concave curvature that corresponds to a curvature of a respective body location.

Figure 2:
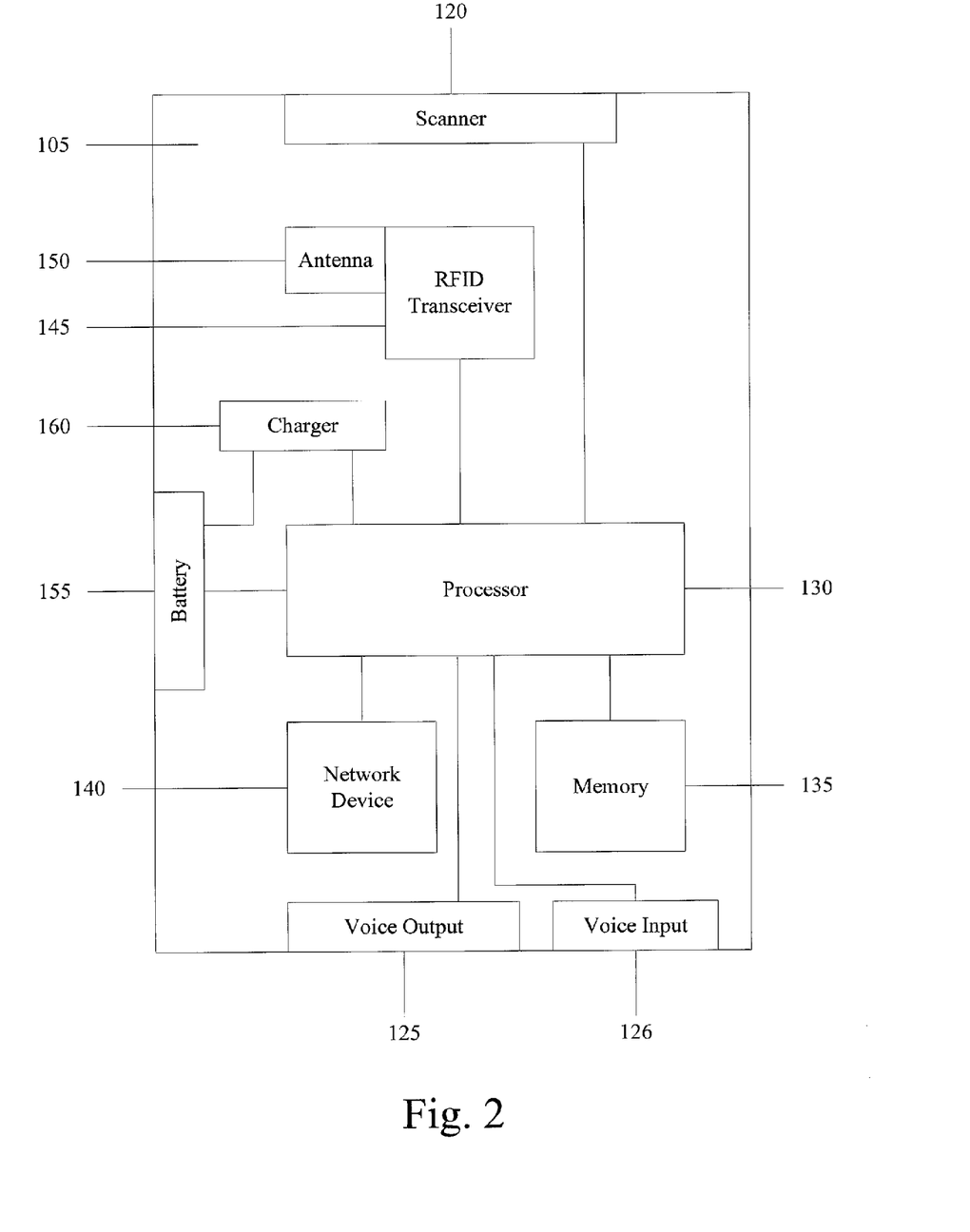
FIG. 2 shows an exemplary interior view of the mountable mobile computer of FIG. 1.

FIG. 2 shows an exemplary interior view of the mountable mobile computer 100 of FIG. 1. As discussed above, the mountable mobile computer 100 may also include components within the top housing 105 and the bottom housing 110. In the exemplary embodiment, within the top housing 105 and the bottom housing 110, the mountable mobile computer 100 may include the scanner 120, the audio output 125, the voice input 126, a processor 130, a memory 135, a network device 140, a RFID (radio frequency identification) transceiver 145, an antenna 150, a battery 155, and a charger 160. It should be noted that the mountable mobile computer 100 may include further components not shown in the exemplary embodiment. It should again also be noted that the components found within the mountable mobile computer 100 are manufactured using conventional technologies but are sized to fit within the housing 105.

In the exemplary embodiment, the scanner 120, the audio output 125, and the voice input 126 may also be at least partially on the periphery of the housing 105 and within the housing 105. The scanner 120 may include circuitry (e.g., scanning engine) that is housed within the housing 105 to protect it from any potential damage. However, the scanner 120 may also include a capturing device (e.g., camera) that requires a line of sight to an object it scans. For example, the scanner 120 may be a bar code scanner or an imager that reads an object. Therefore, a portion of the scanner 120 may be found on the periphery of the housing 105. The audio output 125 and the voice input 126 may also include circuitry that may be housed within the top housing 105 and the bottom housing 110 to protect it from any potential damage. The audio output 125 may be a speaker and the voice input 126 may be a microphone. Therefore, including the audio output 125 and the voice input 126 on the periphery of the housing 105 may improve any sound qualities since the sound waves are not required to pass through a barrier (e.g., walls of the housing 105). However, it should be noted that the audio output 125 and the voice input may be found completely within the top housing 105 and the bottom housing 110 since, unlike the scanner 120, the audio output 125 and the voice input 126 do not require a direct path for incoming and outgoing sound waves.

The processor 130 may be a central computing unit of the mountable mobile computer 100. The processor 130 may be responsible for management of the components of the mountable mobile computer 100. As illustrated in the exemplary embodiment, the scanner 120, the audio output 125, the voice input 126, the memory 135, the network device 140, the RFID transceiver 145, the battery 155, and the charger 160 may be electrically connected to the processor 130.

The memory 135 may be a storage unit of the mountable mobile computer 100. The processor 130 may access the memory 135 to retrieve or send data. The memory 135 may include both a read-only memory (ROM) that includes preset data that is intended to be used by the finer mounted mobile computer 100 and random-access memory (RAM) that includes data that is inputted and retrieved by the processor 130.

The network device 140 may be a connection unit of the mountable mobile computer 100. The network device 140 may enable the mountable mobile computer 100 to access a network that is available in an area where the mountable mobile computer 100 is located. In the exemplary embodiment, the network device 140 may wirelessly connect to an available network. However, it should be noted that the network device 140 may connect through physical means (e.g., cables, wires, etc.). In such an embodiment, the network device may include a port (not shown) that is located on the housing 105 to receive a network access cable. The network device 140 may also provide wireless connections such as IEEE 802.11, 802.16, Bluetooth, etc. It should be noted that the mountable mobile computer 100 includes the proper components to allow it to be used as, for example, a cellular phone. Thus, the network device 140 may be used in such a capacity. Due to the size of the mountable mobile computer 100 and the nature of telephone use, a separate antenna may be incorporated to be used with, for example, a wireless headset. However, it is noted that the mountable mobile computer 100 may already include the necessary components to provide telephonic capabilities.

The RFID transceiver 145 and the antenna 150 may be units that read RFID tags (i.e., transponders). The RFID transceiver 145 may receive/transmit RFIDs via the antenna 150 from available RFID tags. The RFID tags may be located on various objects. For example, in a warehouse environment, the RFID tag may be on a package. Thus, when a user wearing the mountable mobile computer 100 approaches (passive) or scans (active) the RFID tag with the RFID transceiver 145 via the antenna 150, the RFID may be read and may be, for example, processed by the processor 130 and subsequently stored in the memory 135, sent to the network via the network device 140, etc.

The battery 155 may be a unit that provides the power to the mountable mobile computer 100. In the exemplary embodiment, the battery 155 may be, for example, a coin battery. The housing 105 may include a panel (not shown) that allows a user to remove/replace the battery 155. The battery 155 may also be a rechargeable (i.e., lithium ion) battery. The housing 105 may include a port that receives a recharging unit that recharges the battery 105. The mountable mobile device 100 may be equipped with the charger 160 so that the battery 155 is not required to be removed or replaced when the capacity of the battery 155 has been fully discharged. For example, the mountable mobile device 100 may be placed in a cradle so that electrical contacts (not shown) may couple to corresponding contacts on the cradle to recharge the battery 155 via the charger 160.

Figure 3:
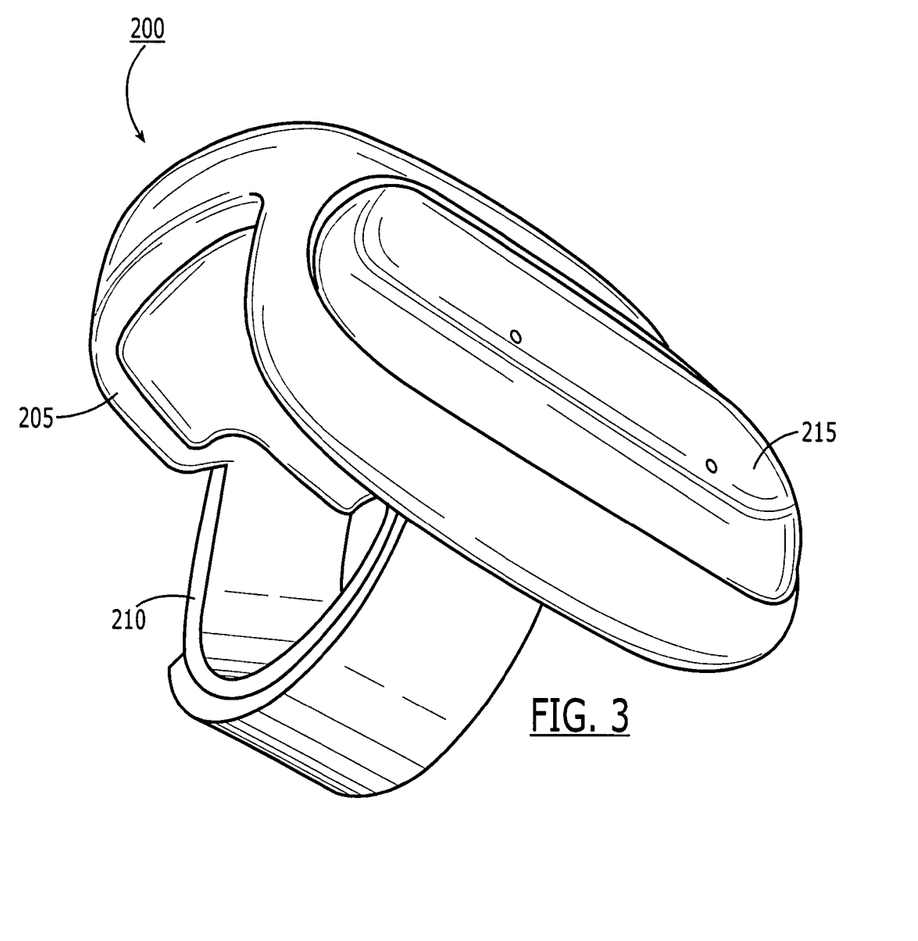
FIG. 3 shows an exemplary finger mount to be used in conjunction with the mountable mobile computer of FIG. 1.

FIG. 3 shows an exemplary finger mount 200 used in conjunction with the mountable mobile computer 100 of FIG.

1. It should be noted that the finger mount 200 may be a part of the mountable mobile computer 100 and not a separate unit. For example, the mountable mobile computer 100 may include straps with fasteners that may affix the mountable mobile computer 100 on a user's finger. The fasteners may be, for example, hook and loop fasteners, snaps, buttons, etc. The mountable mobile computer 100 may also utilize a ring or spring clip to affix the mountable mobile computer 100 on the user's finger. The mount 200 may be manufactured using the same materials used to manufacture the housing 105.

In the exemplary embodiment, the finger mount 200 may attach to the mountable mobile computer 100 on the bottom housing 110. A mechanical connector (not shown) on the mountable mobile computer 100 may be used to attach the finger mount 200 to the mountable mobile computer 100. The connector may be, for example, a male connector shaped as a ring with tabs adapted for insertion into a corresponding connector on the finger mount 200. The tabs may provide a locking mechanism via recesses or cut-outs that prevent movement of the mountable mobile computer 100 with respect to the finger mount 200. The connector may also provide for rotation, allowing the user to orient the mountable mobile computer 100 as desired.

The finger mount 200 may be designed to affix the mountable mobile computer 100 on any of the user's fingers. For example, the mountable mobile computer 100 may be mounted on a proximal or distal portion of the user's finger. In the exemplary embodiment, the mountable mobile computer 100 may be mounted on the index finger. However, it should be noted that the mountable mobile computer 100 may be mounted on a user's middle, ring, pinky, or thumb finger of either a left or right hand, depending on the user's preference. Additionally, the mount 200 may be mounted on multiple adjacent fingers, for example, the index and middle fingers.

In the exemplary embodiment, the finger mount 200 may include straps 210 equipped with fasteners. The fasteners may be, for example, hook and loop fasteners, snaps, buttons, etc. Those skilled in the art will understand that the straps 210 with fasteners allow the finger mount 200 to adjust to accommodate a user's finger. A bottom side 205 of the finger mount 200 may also exhibit a concave curvature that conforms to a curvature of the user's finger to provide comfort for the user.

As discussed above, the straps 210 may be replaced with a spring clip. The spring clip (not shown) may adjust its width to accommodate the user's preference for the location on a specific finger. For example, the spring clip may hold an original position that is narrow. Once a user inserts a finger, the spring clip may expand to correspond to the width of the finger. Also, as discussed above, the straps 210 may also be replaced with a ring. The ring may be manufactured using an expandable material (e.g., flexible plastic, rubber, etc.) to accommodate the user's preference for the location on a specific finger. The ring may also be manufactured using a rigid material (e.g., rigid plastic, metal) that is custom designed for an individual user's location on a specific finger.

It should be noted that the straps 210 or any other holding mechanism may be designed with two holding sites. That is, one set of straps may be disposed toward a distal end of a finger and another set of straps may be disposed toward a proximal end of a finger. The use of two holding sites may provide a stabilization of the mountable mobile computer 100. Furthermore, the mountable mobile computer may be larger than the mount, in particular, a width of the straps 210 or other holding mechanism. That is, the mountable mobile computer 100 may extend beyond the mount 200. A stabilizing holding mechanism may alleviate any inadvertent movement as a consequence of using the mountable mobile computer 100.

The finger mount 200 may also include a scanning trigger 215. As discussed above, a user may actively scan or read RFID tags. To accommodate an active scanning process, the scanning trigger 215 may be provided. The trigger 215 may comprise any type of mechanical and/or electrical switch. For example, the trigger 215 may be a push button, a rocker switch, a slide switch, a pressure sensitive switch, etc. In the exemplary embodiment, the trigger 215 may be a mechanical push button encased within a flexible membrane (e.g., a rubber cover). The trigger 215 may be communicatively coupled to the mountable mobile computer 100. The trigger 215 may communicate with the mountable mobile computer 100 via an electrical coupling. Thus, the trigger 215 may be engaged by depressing the flexible membrane that activates the scanner 120, thereby enabling a scanning of a barcode or another function. In an exemplary embodiment, when the trigger 215 is engaged, a mechanical and/or electrical connection between the mount 200 and the mountable mobile computer 100 may be established.

It should be noted that the finger mount 200 may include other components such as electrical components. For example, the finger mount 200 may include a memory, a micro-processor, a communication and power contacts, and a battery. The finger mount memory may function and perform substantially similar to the memory 135. The finger mount memory may store data pertaining to the finger mount 200 and/or the mountable mobile computer 100. The micro-processor may function and perform substantially similar to the processor 130 except the micro-processor pertains to the finger mount 200. The finger mount communication and power contacts may provide an electrical connection to corresponding contacts pertaining to communication and power capabilities. The finger mount battery may provide a power supply to the finger mount 200 but may also provide a power supply to the mountable mobile computer 100 via the power contacts.

Figure 4:
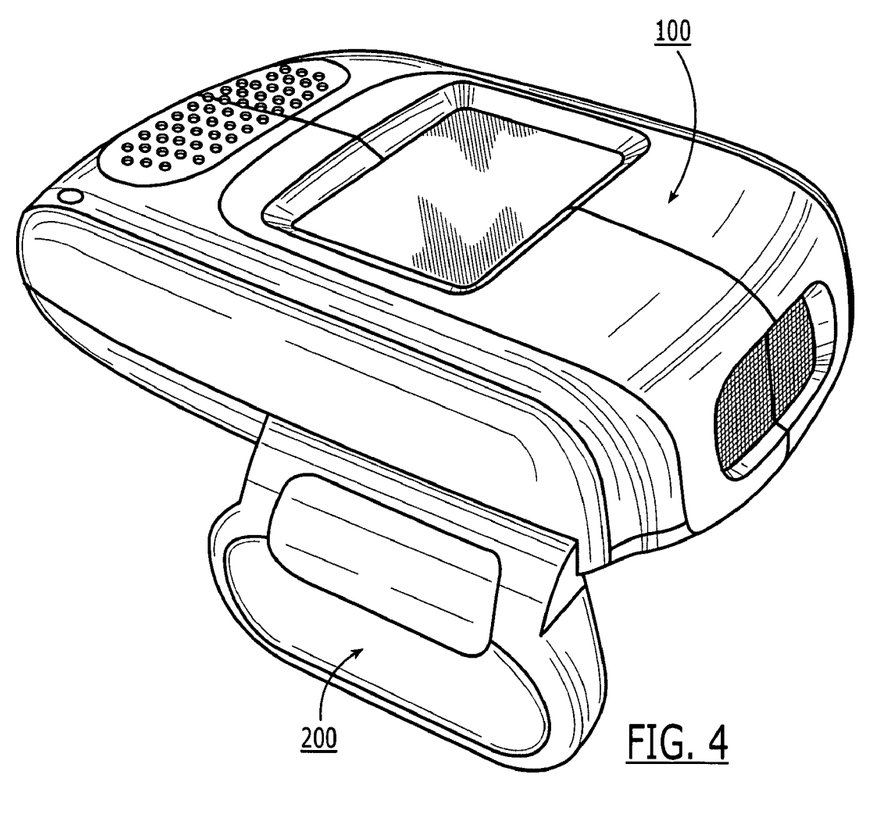
FIG. 4 shows an assembled view of the mountable mobile computer of FIG. 1 attached to the finger mount of FIG. 3.

FIG. 4 shows an assembled view of the finger mount 200 of FIG. 3 attached to the mountable mobile computer 100 of FIG. 1. As discussed above, in the assembled view, the finger mount 200 may be attached to the mountable mobile computer 100 on the bottom housing 110. The finger mount 200 may be attached toward a front side (toward the scanner 120) of the bottom housing 110 of the mountable mobile computer 100. However, it should be noted that the finger mount 200 may be attached along any portion of the bottom housing 110. In this exemplary embodiment, the assembled view shows that the length of the finger mount 200 does not surpass the length of the mountable mobile computer 100. Because the mountable mobile computer 100 is designed to be worn on a user's finger when attached to the finger mount 200, the length of the finger mount 200, the mountable mobile computer 100, and/or the assembled unit may exhibit a length of a proximal phalanx of the user's finger. This may enable a user to freely bend the finger to which the mountable mobile computer 100 is mounted, further providing flexibility for the user. Furthermore, the orientation of the finger mount 200 having a longitudinal axis parallel to a longitudinal axis of the mountable mobile computer 100 is only exemplary. That is, the finger mount 200 may be oriented so that the longitudinal axis is perpendicular to the longitudinal axis of the mountable mobile computer 100.

In another exemplary embodiment, the mountable mobile computer 100 may be assembled with the finger mount 200 so that when in an operative position, the holding mechanism (e.g., straps 210) of the finger mount 200 is placed on a distal end of a finger. Furthermore, the mountable mobile computer 100 may be large and extend beyond the width of the finger mount 200. In such an embodiment, the mountable mobile computer 100 may extend onto the back of the hand of a user. Thus, when a user uses the mountable mobile computer 100, the back of the hand serves as a steadying surface (e.g., provides an opposing force) when, for example, the user pushes keys/buttons. This exemplary embodiment would not require a stabilizing holding mechanism (e.g., two sets of straps) as discussed above. It should be noted that the mountable mobile computer 100 may be oriented on an inner surface of a finger and the mountable mobile computer 100 may extend toward a wrist onto the palm of the hand of the user.

Figure 5:
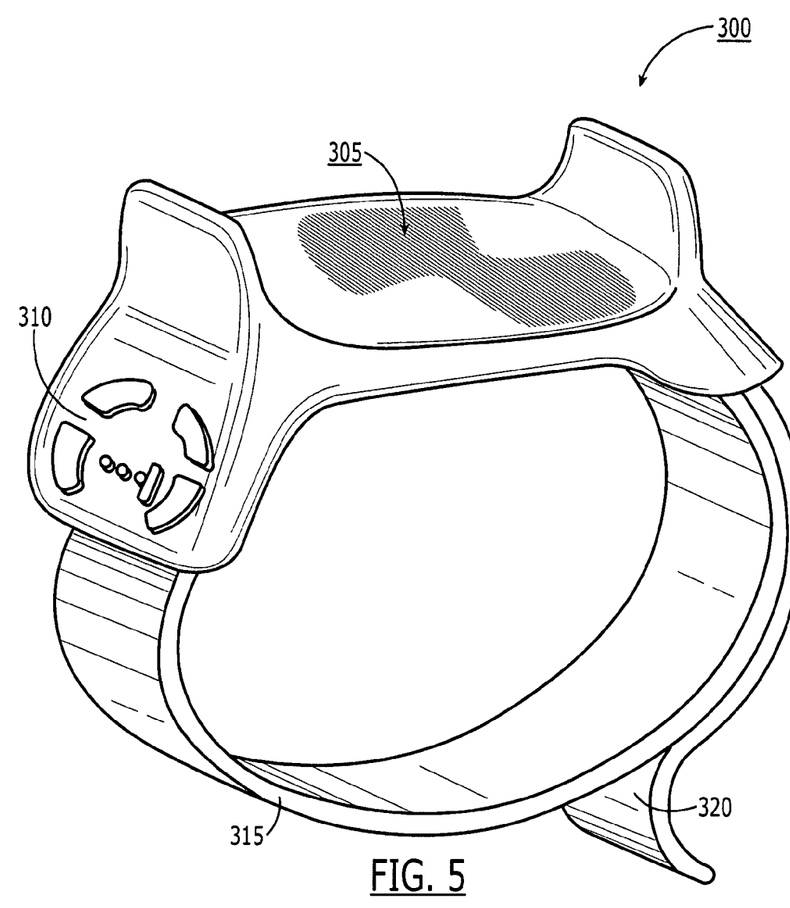
FIG. 5 shows an exemplary wrist mount to be used in conjunction with the mountable mobile computer of FIG. 1.

FIG. 5 shows an exemplary wrist mount 300 to be used in conjunction with the mountable mobile computer 100 of FIG. 1. It should be noted that the wrist mount 300 may be a part of the mountable mobile computer 100 and not a separate unit. For example, the mountable mobile computer 100 may include straps with fasteners that affix the mountable mobile computer 100 on a user's wrist. The fasteners may be, for example, hook and loop fasteners, snaps, buttons, etc. The mountable mobile computer 100 may also utilize a spring clip to affix the mountable mobile computer 100 on the user's wrist. The wrist mount 300 may be manufactured using the same materials used to manufacture the housing 105. Furthermore, due to a larger possible discrepancy between a wrist of a first user and a wrist of a second user, the wrist mount 300 may be elastic to suit the various circumferences of wrists.

In the exemplary embodiment, the mountable mobile computer 100 may be incorporated into the wrist mount 300. An electrical connector may be disposed to electrically couple the mountable mobile computer 100 with the wrist mount 300. However, it should be noted that the wrist mount 300 may also simply house the mountable mobile computer 100.

The wrist mount 300 may include a recess 305, a data input arrangement 310, and straps 315. The recess 305 may be used as a location in which the mountable mobile computer 100 is housed in the wrist mount 300. The recess 305 may allow a user to insert the mountable mobile computer 100. Various locking mechanisms may be included with the recess 305 to securely fasten the mountable mobile computer 100 with the wrist mount 300. For example, retractable blocks may extend into the recess 305. While the mountable mobile computer 100 is being inserted, the blocks may retract. Once the mountable mobile computer 100 has been fully inserted, the blocks may return to an extended state into corresponding recesses on the mountable mobile computer 100. The recess 305 may extend the entire length of the wrist mount 300. The wrist mount 300 may also include other electrical components as described above with reference to the finger mount 200.

The wrist mount 300 may include a data input arrangement 310. As discussed above, the mountable mobile computer 100 may be designed to be relatively small. Accordingly, a data input arrangement disposed on the mountable mobile computer 100 may also be relatively small. To provide convenience for the user, the data input arrangement 310 may provide larger keys, larger key prints, etc. Furthermore, the data input arrangement 310 may provide further data inputs for the user to enter. That is, when the mountable mobile computer is worn on the wrist, various functionalities may require the user to enter parameters or other data. However, it should be noted that the wrist mount 300 may not include the data input arrangement 310. That is, another embodiment of the wrist mount 300 may include only the recess 305 and the straps 315.

The wrist mount 300 may include the straps 315. The straps 315 may be attached to the sides of the wrist mount 300. The straps 315 may be the mechanism that holds the wrist mount 300 to a user's wrist. The straps 315 may be elastic, thereby allowing the wrist mount to be held taut to various sizes of wrists. The straps 315 may include connectors 320 that fasten the straps 315 together around the user's wrist. The connectors 320 may be any fastening mechanism such as hook and loop fasteners, snaps, buttons, etc.

Similar to the finger mount 200, the straps 315 may be replaced with a spring clip. The spring clip (not shown) may adjust its width to accommodate the user's preference for the location on the wrist. For example, the spring clip may be placed toward the hand side of the wrist. A user may slide the wrist mount 300 toward the elbow side of the wrist, thereby increasing the diameter of the spring clip and keeping the wrist mount 300 in a taut position. The spring clip may be manufactured using a flexible polymer. The straps 315 may also be replaced with an adjustable belt. The adjustable belt may increase in diameter to allow a user to slide a hand therethrough. Once the adjustable belt is around the wrist, the user may pull the belt to decrease the diameter, thereby conforming to the diameter of the wrist.

Also similar to the finger mount 200, the straps 315 or any other holding mechanism may be designed with two holding sites. That is, one set of straps may be disposed toward a distal end of the wrist and another set of straps may be disposed toward a proximal end of the wrist. The use of two holding sites provides a stabilization of the mountable mobile computer 100. Because a wrist tapers toward the distal end, the proximal holding mechanism may have a larger diameter than a distal holding mechanism.

A bottom side of the wrist mount 300 may exhibit a concave curvature that conforms to a curvature of a user's wrist. In contrast to a rounder finger, the curvature of the wrist mount 300 may be less steep than the curvature exhibited by the finger mount 200. Furthermore, the curvature of the wrist mount 300 may be adjustable to conform to any size of a user's wrist. The curvature of the wrist mount 300 may cover half a surface area of the wrist. By covering at least half a surface area of the wrist, the wrist mount 300 may be stable on the user's wrist, thereby allowing, for example, the user to comfortably push keys on the data input arrangement 310. It should be noted that the concave curvature is only exemplary and the wrist mount 300 may have a linear bottom side with no curvature.

Figure 6:
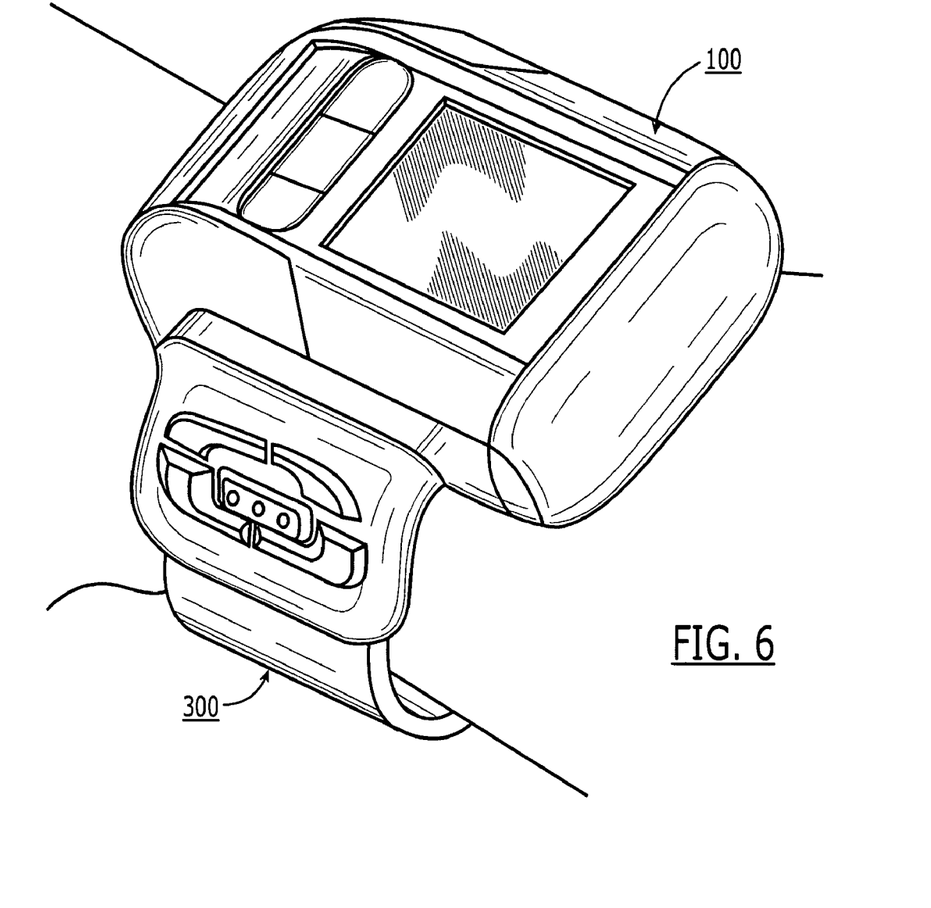
FIG. 6 shows an assembled view of the mountable mobile computer of FIG. 1 attached to the wrist mount of FIG. 5.

FIG. 6 shows an assembled view of the mountable mobile computer 100 of FIG. 1 attached to the wrist mount 300 of FIG. 5. As discussed above, in the assembled view, the mountable mobile computer 100 may be incorporated into the wrist mount 300. The mountable mobile computer 100 may attach to the wrist mount 300 via the recess 305. However, it should be noted that the mountable mobile computer 100 may be inserted into the wrist mount 300 if the recess 305 is accessible via a hole. The hole may be disposed on a longitudinal side of the wrist mount 300. When the mountable mobile computer 100 is attached to the wrist mount 300, the mountable mobile computer 100 is designed to be worn on a user's wrist. Consequently, the length of the wrist mount 300, the mountable mobile computer 100, and/or the assembled unit may be up to a length of a forearm of a user. The wrist mount 300 also allows ambidextrous use of the mountable mobile computer 100. That is, the wrist mount 300 may be worn on either a left or right wrist and the mountable mobile computer 100 may be inserted accordingly.

Figure 7A:
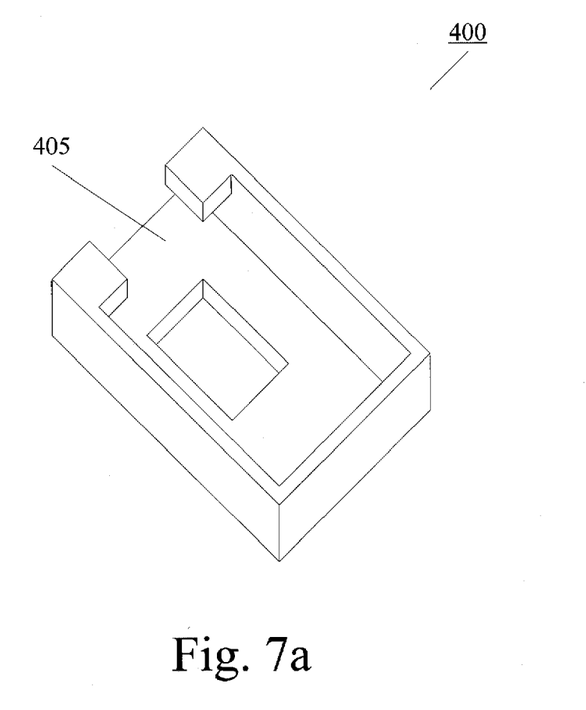
FIG. 7*a* shows a front side of an exemplary waist mount to be used in conjunction with the mountable mobile computer of FIG. 1.

FIG. 7a shows a front side of an exemplary waist mount 400 to be used in conjunction with the mountable mobile computer 100 of FIG. 1. It should be noted that the waist mount 400 may be a part of the mountable mobile computer 100 and not a separate unit. For example, the mountable mobile computer 100 may include straps or clips that affix the mountable mobile computer 100 on a user's waist. The straps may circumscribe the user's waist while the clips may attach to a belt or other edge found on a user's waist. The waist mount 400 may be manufactured using the same materials used to manufacture the housing 105.

In the exemplary embodiment, the mountable mobile computer 100 may be incorporated into the waist mount 400. An electrical connector may be disposed to electrically couple the mountable mobile computer 100 with the waist mount 400. However, it should be noted that the waist mount 400 may also simply house the mountable mobile computer 100.

The waist mount 400 may include a recess 405. The recess 405 may be used as a location in which the mountable mobile computer 100 is housed. The recess 405 may substantially resemble the recess 305 of the wrist mount 300. For example, the recess 405 may also include various locking mechanisms to securely fasten the mountable mobile computer 100 with the waist mount 400. As illustrated, the recess 405 may provide a user to insert the mountable mobile computer 100 into a hole that leads to the recess 405. However, the recess 405 may allow a user to directly insert the mountable mobile computer 100 therein.

Figure 7B:
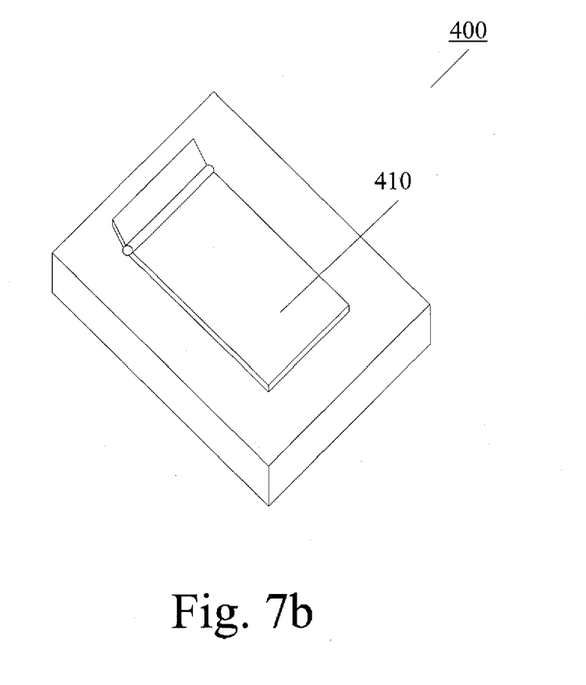
FIG. 7*b* shows a back side of the exemplary waist mount of FIG. 7*a*.

FIG. 7b shows a back side of the exemplary waist mount 400 of FIG. 7a. The waist mount 400 may include a belt clip 410 to attach the mountable mobile computer 100 to a user's waist. The belt clip 410 may be spring loaded to retract to an original position once clipped to a belt, pants seam, etc. It should be noted that the belt clip 410 may be used to clip the waist mount 400 in other locations as well, for example, a bag strap. That is, the waist mount 400 may be used to attach the mountable mobile computer in any location where the belt clip 410 may be used. The waist mount 400 may also include other electrical components as described above with reference to the finger mount 200.

Figure 8:
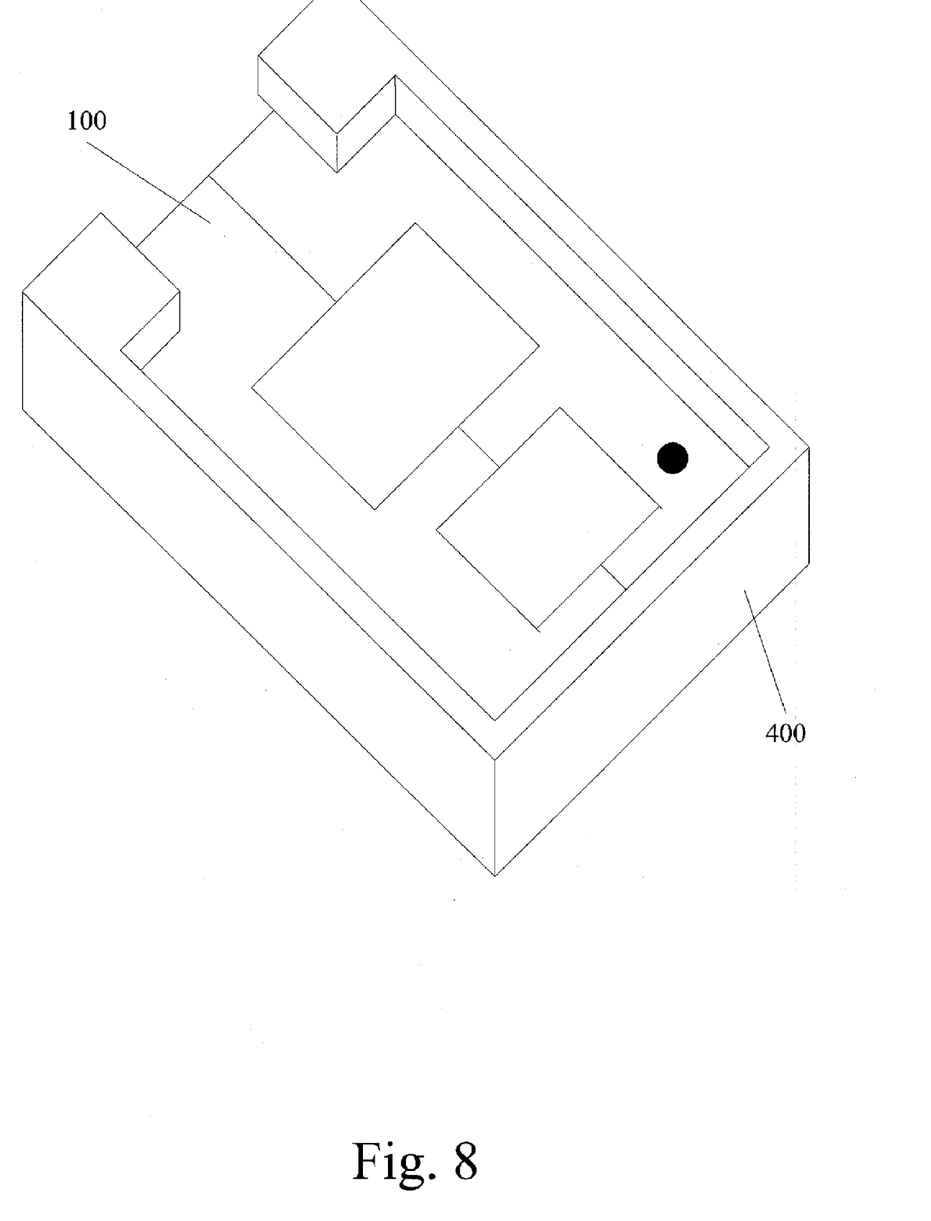
FIG. 8 shows an assembled view of the mountable mobile computer of FIG. 1 attached to the waist mount of FIG. 7*a*.

FIG. 8 shows an assembled view of the mountable mobile computer 100 of FIG. 1 attached to the waist mount 400 of FIG. 7a. As discussed above, in the assembled view, the mountable mobile computer 100 may be incorporated into the waist mount 400. The mountable mobile computer 100 may attach to the waist mount 300 by inserting the mountable mobile computer 100 through a hole into the recess 405. However, it should be noted that the mountable mobile computer 100 may be directly inserted into the recess 405.

As discussed above, the exemplary embodiments of the present invention utilize a worn position as a means to determine precedence of functionalities of the mountable mobile computer 100. For example, when the mountable mobile computer 100 is attached to the finger mount 200 and worn on a user's finger, functionalities such as scanning and RFID capabilities may take precedence to functionalities such as voice capabilities. In another example, when the mountable mobile computer 100 is attached to the wrist mount 300 and worn on a user's wrist, functionalities such as RFID capabilities may take precedence over functionalities such as scanning and voice capabilities. In yet another example, when the mountable mobile computer 100 is attached to the waist mount 400 and worn on a user's waist, functionalities such as voice capabilities may take precedence over functionalities such as scanning and RFID capabilities. It should be noted that the term "precedence" may refer to either an enabling/disabling of functionalities, an ordering of a list in which certain functionalities are given priority over other functionalities (e.g., allocate more resources to one functionality over another), or a combination thereof.

The position in which the mountable mobile computer 100 is worn may determine other factors. For example, the display 115 may include a touch pad data input arrangement. Thus, depending on the worn position, the display 115 may show different types of touch pad configurations. That is, various user interface configurations may be determined based on worn location. For example, when the mountable mobile computer 100 is worn on a finger, a touch pad focusing on keys pertaining to scanning and RFID capabilities may be displayed. In another example, when the mountable mobile computer 100 is worn on a wrist, a touch pad focusing on keys pertaining to RFID capabilities only may be displayed. In yet another example, when the mountable mobile computer 100 is worn on a waist, a touch pad focusing on voice capabilities such as a telephone pad may be displayed.

The mountable mobile computer 100 may include a mechanism to determine a relative position in which the mountable mobile computer 100 is being worn. Through this determination, the processor 130 may properly determine the precedence of functionalities. The following description describes an exemplary mechanism in which the mountable mobile computer determines the precedence of functionalities.

Figure 9A:
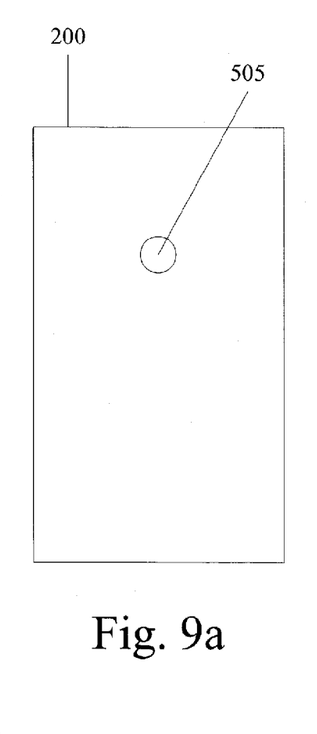
FIG. 9*a* shows an exemplary contact for the finger mount of FIG. 2.

FIG. 9a shows an exemplary contact 505 for the finger mount 200 of FIG. 2. The contact 505 may be a coupler disposed on any surface of the finger mount 200. However, it should be noted that the contact 505 may be required to be positioned on a surface that contacts the mounted mobile computer 100 when assembled. The contact 505 may be, for example, a pin. The pin may be metallic and therefore serve as an electrical coupler between the finger mount 200 and the mounted mobile computer 100. The contact 505 may be a flat pin that is flush with the surface in which it is disposed. The contact 505 may provide a signal that is transmitted upon a completed circuit.

Figure 9B:
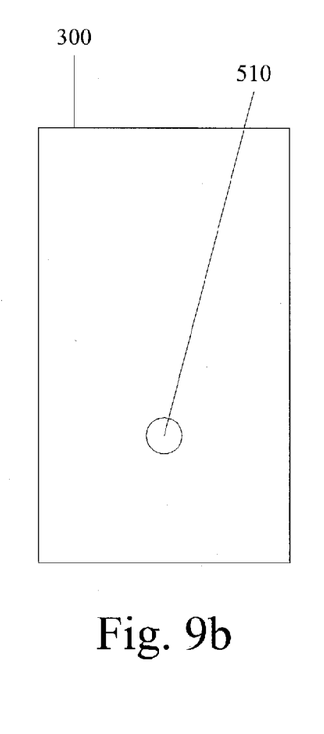
FIG. 9*b* shows an exemplary contact for the wrist mount of FIG. 5.
Figure 9C:
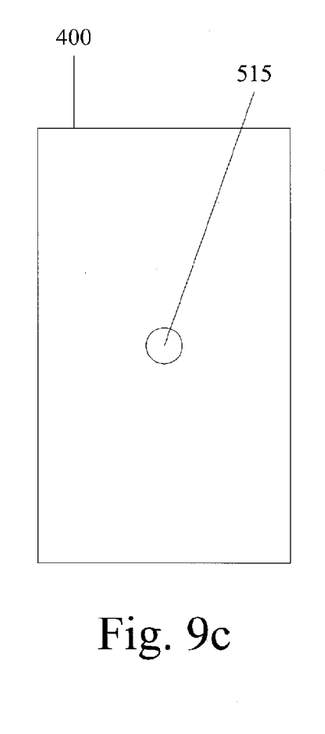
FIG. 9*c* shows an exemplary contact for the waist mount of FIG. 7*a*.

FIG. 9b shows an exemplary contact 510 for the wrist mount 300 of FIG. 5. FIG. 9c shows an exemplary contact 515 for the waist mount 400 of FIG. 7a. The contacts 510, 515 may be substantially similar to the contact 505 of the finger mount 505. According to the exemplary embodiment, the contacts 505, 510, 515 may be located at a predetermined site. The differing locations may provide the necessary difference for the mounted mobile computer to determine the worn location. For example, the contact 505 may be disposed at a high location; the contact 510 may be disposed at a low location; and the contact 515 may be disposed at a central location. It should be noted that the use of location as the indicator is only exemplary. The present invention may utilize other forms of indicating to the mounted mobile computer 100 the worn location. These forms will be discussed below.

Figure 9D:
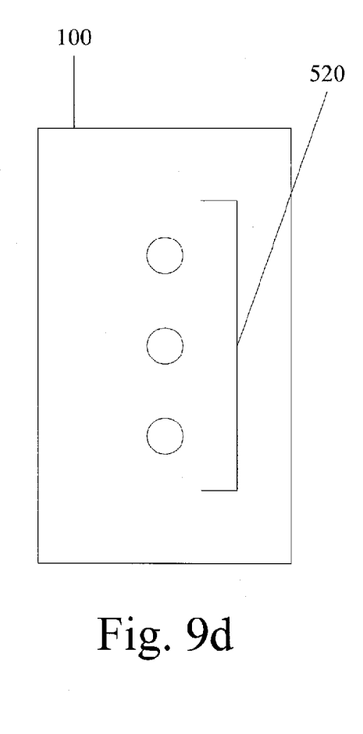
FIG. 9*d* shows exemplary contacts for the mountable mobile computer of FIG. 1.

FIG. 9d shows exemplary contacts 520 for the mountable mobile computer 100 of FIG. 1. The contacts 520 may be corresponding contacts where one of the contacts 520 couples to one of the contacts 505, 510, 515 of the various mounts. For example, a top contact of the contacts 520 may correspond to the contact 505 of the finger mount 200; a bottom contact of the contacts 520 may correspond to the contact 510 of the wrist mount 300; and a middle contact of the contacts 520 may correspond to the contact 515 of the waist mount 400. Thus, when the mountable mobile computer 100 determines which of the contacts 520 is coupled, a determination may be made as to the types of functionalities to give precedence. As discussed above, the contacts 505, 510, 515 may be pins. Thus, the contacts 520 may be corresponding pin holes. If the contacts 505, 510, 515 are flat pins, a coupling with the contacts 520 may complete the circuit and a location signal may be received by the mountable mobile computer 100.

Other mechanisms of determining worn location may be embodied by the present invention. For example, the contact 520 may be a single pin hole while the contacts 505, 510, 515 may be a pin at a common location with varying lengths. Thus, when any of the contacts 505, 510, 515 is inserted into the contact 520, a sensor or electrical connection may be established allowing the processor 130 to determine the worn location. In another example, contacts may not be used. If the mount is capable of transmitting a signal to the mountable mobile computer 100, a worn location may be ascertained. In yet another example, the locking mechanisms that secure the mounted mobile computer 100 to the respective mount may be used as the location determination mechanism. The different mounts may secure the mounted mobile computer 100 in different areas of the housings 105, 110. Thus, when certain corresponding locks or set of locks of the mounted mobile computer 100 are engaged, a determination may be made.

The exemplary embodiment of the mountable mobile computer 100 described above present several advantages over a conventional wearable terminal. For example, the mountable mobile computer 100 is designed for ambidextrous. Therefore, regardless of user preference, every user may be accommodated. Those skilled in the art will understand that the finger mount 200 may be attached to any substantially cylindrical shape (e.g., a finger) and does not discriminate between fingers on a right hand or a left hand. The same applies to the wrist mount 300. As discussed above, the waist mount 400 may be worn in any site in which the belt clip 405 may be used. In addition, those skilled in the art will understand that a detachable mount allows the mountable mobile computer 100 to be worn so that, for example, the display 115 is always in a correct orientation with respect to the user.

Another advantage is the versatility and efficiency provided by the different locations the mountable mobile computer 100 may be worn. For example, the mountable mobile computer 100 may be worn in different locations depending on an application in which the user performs. The user may efficiently utilize the mountable mobile computer 100 because the worn location does not hinder any use of the functionalities. Furthermore, additional components may be attached to the mountable mobile computer such as a headset (when worn on the waist). These additional components may be uncomfortable and detrimental to the user if the mountable mobile computer is worn at a particular location.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A system, comprising:
   a mobile device having a set of functionalities; and
   a plurality of wearable mounts comprising at least a first wearable mount and a second wearable mount configured to couple to the mobile device, the coupling of the mobile device with the first wearable mount making the mobile device wearable at a first location on a user's body and the coupling of the mobile device with the second wearable mount making the mobile device wearable at a second location on the user's body, wherein a first subset of the set of functionalities of the mobile device is automatically selected upon coupling the mobile device to the first wearable mount and a second subset of the set of functionalities of the mobile device is automatically selected upon coupling the mobile device to the second wearable mount,
   wherein the first wearable mount is different than the second wearable mount and the first subset of the set of functionalities is different than the second subset of the set of functionalities.

2. The system of claim 1, wherein each of the plurality of wearable mounts comprises one of a finger mount, a wrist mount, and a waist mount, each of the plurality of wearable mounts including a fastener.

3. The system of claim 2, wherein the finger mount fastener is one of a ring, a spring clip, and straps.

4. The system of claim 2, wherein the wrist mount fastener is one of straps, a spring clip, and an adjustable belt.

5. The system of claim 2, wherein the waist mount fastener is a belt clip.

6. The system of claim 1, further comprising:
   a first contact disposed on the mobile device; and
   a second contact disposed on a wearable mount from the plurality of wearable mounts, the first and second contacts coupling to indicate the location of the mobile device on the user's body.

7. The system of claim 1, further comprising:
   a receiver disposed in the mobile device; and
   a transmitter disposed in a wearable mount from the plurality of wearable mounts, the transmitter sending a signal to the receiver indicating the location of the mobile device on the user's body.

8. The system of claim 1, wherein the subset of the set of functionalities is based on enabling and disabling available functionalities of the mobile device.

9. The system of claim 1, wherein the subset of the set of functionalities is based on a priority list of available functionalities of the mobile device.

10. The system of claim 1, wherein the mobile device further comprises a display.

11. The system of claim 10, wherein a user interface shown on the display corresponds to the location of the mobile device on the user's body.

12. The system of claim 1, wherein the mobile device further comprises a data input arrangement, the data input arrangement being unique to the location of the mobile device on the user's body.

13. The system of claim 2, wherein, when the mobile device is coupled to the finger mount, the subset of the set of functionalities prioritizes scanning and radio frequency identification capabilities.

14. The system of claim 2, wherein, when the mobile device is coupled to the wrist mount, the subset of the set of functionalities prioritizes radio frequency identification capabilities.

15. The system of claim 2, wherein, when the mobile device is coupled to the waist mount, the subset of the set of functionalities prioritizes voice capabilities.

16. A mobile device having a set of functionalities, comprising:
   a mount coupler configured to couple the mobile device to a plurality of wearable mounts comprising at least a first wearable mount and a second wearable mount, the first wearable mount being different than the second wearable mount; and
   a processor automatically determining a first subset of the set of functionalities for the mobile device upon a coupling of the mobile device to the first wearable mount and the processor automatically determining a second subset of the set of functionalities for the mobile device upon a coupling of the mobile device to the second wearable mount, wherein the first subset of the set of functionalities is different than the second subset of the set of functionalities.

17. The mobile device of claim 16, further comprising:

a contact that couples to a corresponding contact of a wearable mount from the plurality of wearable mounts, the coupling of the contacts indicating a location based on a type of the wearable mount to which the mount coupler is coupled.

18. The mobile device of claim 16, further comprising:

a receiver receiving a signal from a transmitter of a wearable mount from the plurality of wearable mounts, the signal indicating a location based on a type of the wearable mount to which the mount coupler is coupled.

19. A wearable mount, comprising:

a coupler configured to couple a plurality of wearable mounts comprising at least a first wearable mount and a second wearable mount to a mount coupling of a mobile device having a set of functionalities, the first wearable mount being different than the second wearable mount; and a fastener that fastens the first wearable mount to a first location on a user's body and a fastener that fastens the second wearable mount to a second location on the user's body, a first subset of the set of functionalities of the mobile device being automatically selected upon a coupling of the mobile device to the first wearable mount and a second subset of the set of functionalities of the mobile device being automatically selected upon a coupling of the mobile device to the second wearable mount, wherein the first subset of the set of functionalities is different than the second subset of the set of functionalities.

20. The plurality of wearable mounts of claim 19, wherein the fastener is one of straps, a ring, a spring clip, and a belt clip.

21. The plurality of wearable mounts of claim 19, further comprising:

a contact that couples to a corresponding contact of the mobile device, the coupling of the contacts indicating the location.

22. The plurality of wearable mounts of claim 19, further comprising:

a transmitter sending a signal to a receiver of the mobile device, the signal indicating the location.

23. The plurality of wearable mounts of claim 19, wherein the location is one of a finger, a wrist and a waist.

* * * * *